Patented Dec. 16, 1924.

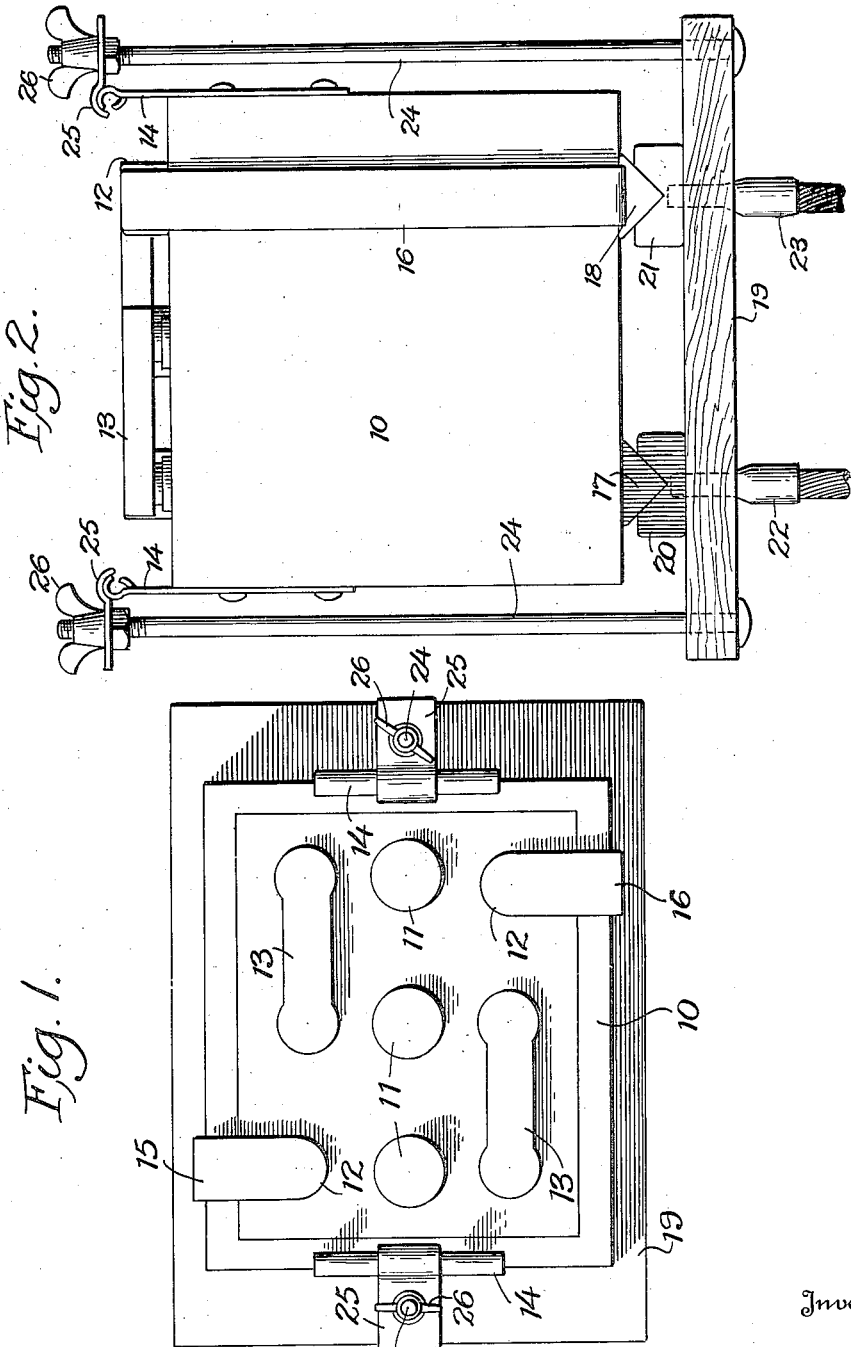

1,519,701

UNITED STATES PATENT OFFICE.

BENJAMIN F. POTH, OF NEW YORK, N. Y.

STORAGE BATTERY.

Application filed February 7, 1924. Serial No. 691,172.

*To all whom it may concern:*

Be it known that I, BENJAMIN F. POTH, a citizen of the United States of America, residing at New York, in the county of New York and State of New York, have invented certain new and useful Improvements in Storage Batteries, of which the following is a specification.

My present invention relates generally to storage batteries and the supports thereof such for instance as commonly used in automobiles and motor cars in such manner that prior to removal of the batteries from their supports it is necessary to remove from the battery terminals the usual main current leads. This arrives from the fact that the leads extend to portions of the automobile, one lead to the main switch and one to a ground clamp. Thus as the battery support or holder is commonly fixed in connection with the chassis it follows that upon each removal and replacement of a battery, the leads must be detached before one battery is lifted out of the support or holder and reattached upon replacement of another battery.

Such a proceeding as the above, necessary under the present practice requires considerable time and trouble and, in careless hands, often results in broken battery boxes and cells and my invention has for its primary object to permit of freely removing a battery from its support or holder upon detachment of the clamps usually employed to hold the battery therein and without the necessity of removing leads or attaching leads upon installation of a new battery or a recharged one.

In a broad sense my invention proposes to accomplish this by providing the battery with permanent conductors leading from its terminals to contact blocks mounted on the battery case in such position as to effectively engage somewhat similar blocks carried by the battery support or holder, to which latter contact blocks the battery leads are secured and may be permanently joined.

Figure 4:
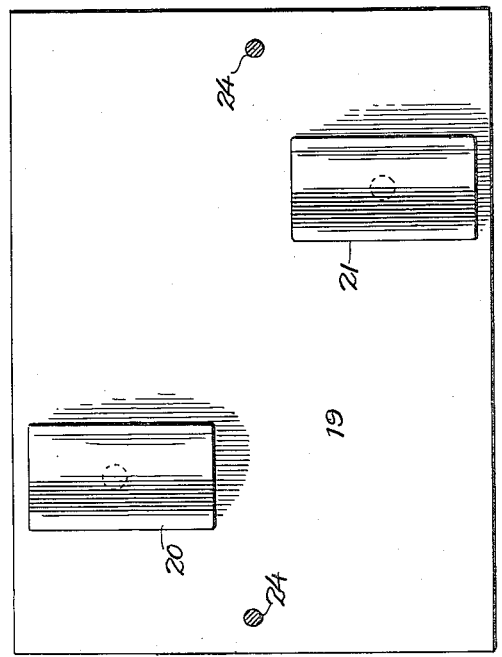
Figure 5:
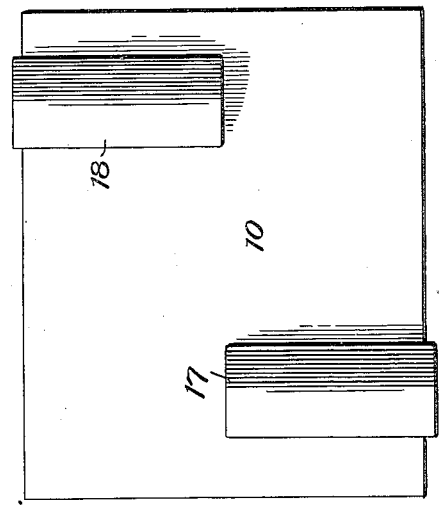
Figure 3:
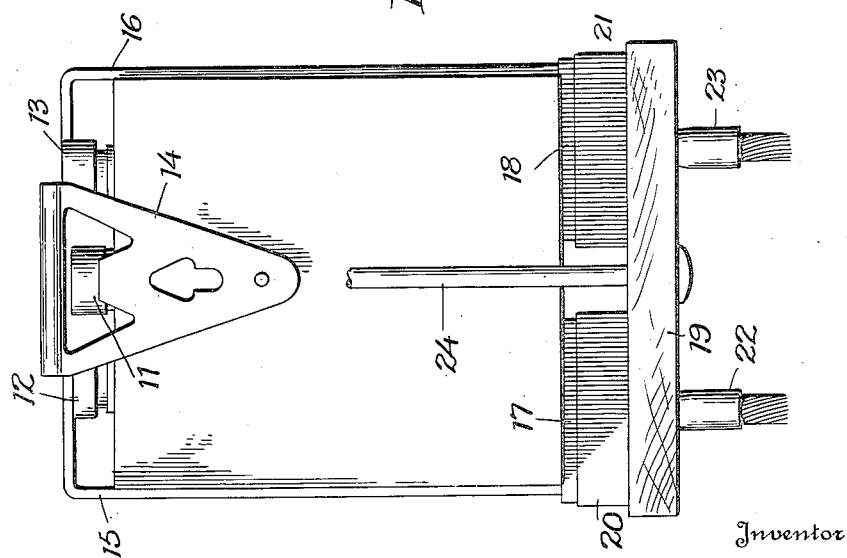

These objects and the particular advantages of my improvements will be apparent from the following description in detail, reference being had to the accompanying drawing which forms a part of this specification, and wherein, Figure 1 is a top plan view showing my invention, Figure 2 is a side elevation thereof, Figure 3 is an end view, partly broken away, Figure 4 is a sectional plan view of the base of the battery support or holder, and Figure 5 is a bottom plan view of the battery box or case.

Referring now to these figures my invention proposes a battery having in addition to its usual cell holding box or case 10, covers 11, terminals 12, connectors 13 and side handles 14, a pair of conductors 15 and 16 which preferably depend along its relatively opposite sides. The upper ends of these conductors 15 and 16 are suitably connected to, or made integral with, the battery terminals 12, and it is obvious from this that the conductors may be made of the same or a different material as compared to that of the terminals 12. The opposite ends of the conductors 15 and 16 lead to, and are either suitably connected, or made integral, with a pair of contact blocks 17 and 18 which are preferably of the elongated rectangular form shown presenting downwardly directed V-shaped contact portions and which are also preferably located, in the substantially spaced relation shown, upon the bottom surface of the battery box or case 10, for a reason which will hereinafter be made plain.

The battery support or holder may be of any suitable construction and any suitable mode of attachment to the parts to which it is connected in use may be resorted to, although its base 19 should be either of a non-conducting material as shown or the contact blocks 20 and 21 should be insulated therefrom. These contact blocks are preferably positioned to receive the battery-carried blocks 17 and 18 thereon and preferably have V-shaped grooves so that blocks 17 and 18 will seat evenly and uniformly therein and contact surfaces of considerable area will thus coincide. The battery leads 22 and 23 usually connected to the terminals 12 are securely fastened to or made integral with the blocks 20 and 21 and extended through the base 19 of the support or holder.

For the connection of the battery in place, the holder or support has upright portions, for instance rods 24, upon the upper threaded ends of which are disposed clips 25 to engage the battery handles 14, and nuts 26 to clamp the battery firmly down within the holder or support, so that by positioning the contact blocks below the battery, the battery clamping means act to hold said blocks in close uniform contact.

Furthermore, in the position shown, the contact blocks are protected and it is obvious that they are thus well adapted to do away with the vexatious delays and dangers of breakage due to the usual necessity of removing tight and frequently corroded lead connections from the battery terminals.

With my improvements in use, it is simply necessary to loosen the battery clamps and lift the battery out of the holder or support, and in replacing the same it is only necessary to properly seat it within the support or holder and again tighten the clamps. My invention thus fully carries out the objects first above stated and presents a simple, practical and economical manner of labor, time and trouble saving.

I claim:

1. A storage battery of the type employed in automobiles and motor cars, having conductors permanently in connection therewith and extending from the terminals thereof, contact members to which said conductors are joined, and a battery support or holder having contact members disposed to receive the contact members of the battery thereagainst when the battery is seated in the support or holder.

2. A storage battery and its support or holder as used in automobiles or motor cars, said battery having contact members and conductors joining the contact members with the battery terminals, and said support or holder having contact members and leads extending therefrom, positioned to receive the contact members of the battery thereagainst.

3. A storage battery and its support or holder as used in automobiles or motor cars, said battery having contact members and conductors joining the contact members with the battery terminals, and said support or holder having contact members and leads extending therefrom, positioned to receive the contact members of the battery thereagainst, and clamping means for holding the battery within its support, adapted to maintain said contact members in firm even contact.

4. A storage battery and its support or holder as used in automobiles or motor cars, said battery having contact members and conductors joining the contact members with the battery terminals, and said support or holder having contact members and leads extending therefrom, positioned to receive the contact members of the battery thereagainst, said contact members being in the form of blocks presenting relatively engaging V-shaped ribs and grooves.

5. A storage battery and its holder or support as used in automobiles and motor cars, said battery having contact blocks on the base thereof and conductors leading along its sides from the terminals thereof to said blocks, and said holder or support having on its base contact blocks positioned to receive the contact blocks of the battery thereagainst and having leads permanently connected to and extending from its said blocks.

6. A storage battery and its holder or support as used in automobiles and motor cars, said battery having contact blocks on the base thereof and conductors leading along its sides from the terminals thereof to said blocks, and said holder or support having on its base contact blocks positioned to receive the contact blocks of the battery thereagainst and having leads permanently connected to and extending from its said blocks, the contact blocks of the battery presenting V-shaped ribs and the contact blocks of the support or holder having V-shaped grooves receiving said ribs.

In testimony whereof I have affixed my signature.

BENJAMIN F. POTH.